Dec. 24, 1929.  B. C. STICKNEY  1,740,843
INTERNAL COMBUSTION ENGINE
Filed May 23, 1927   4 Sheets-Sheet 1

Inventor:
Burnham C. Stickney

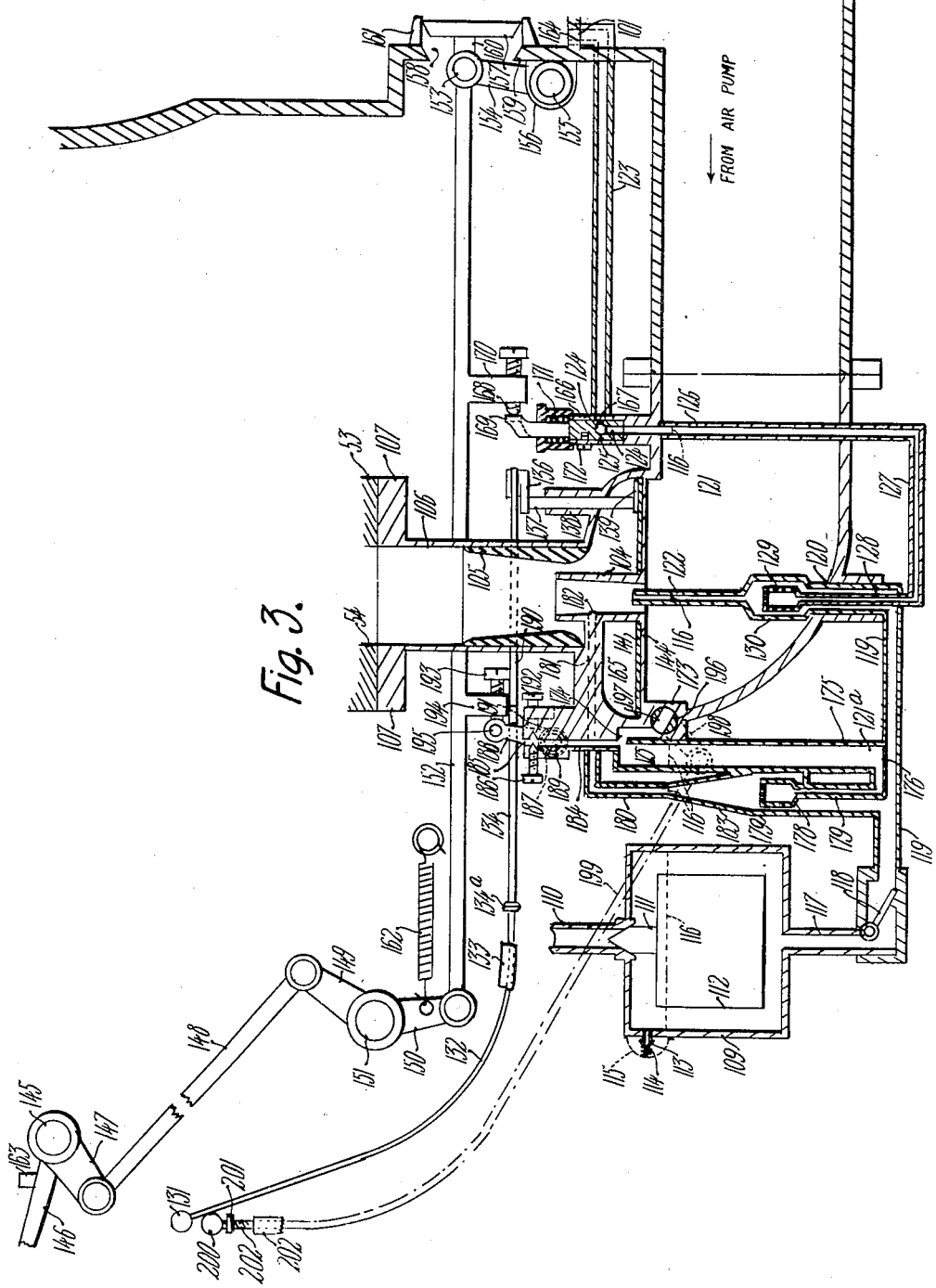

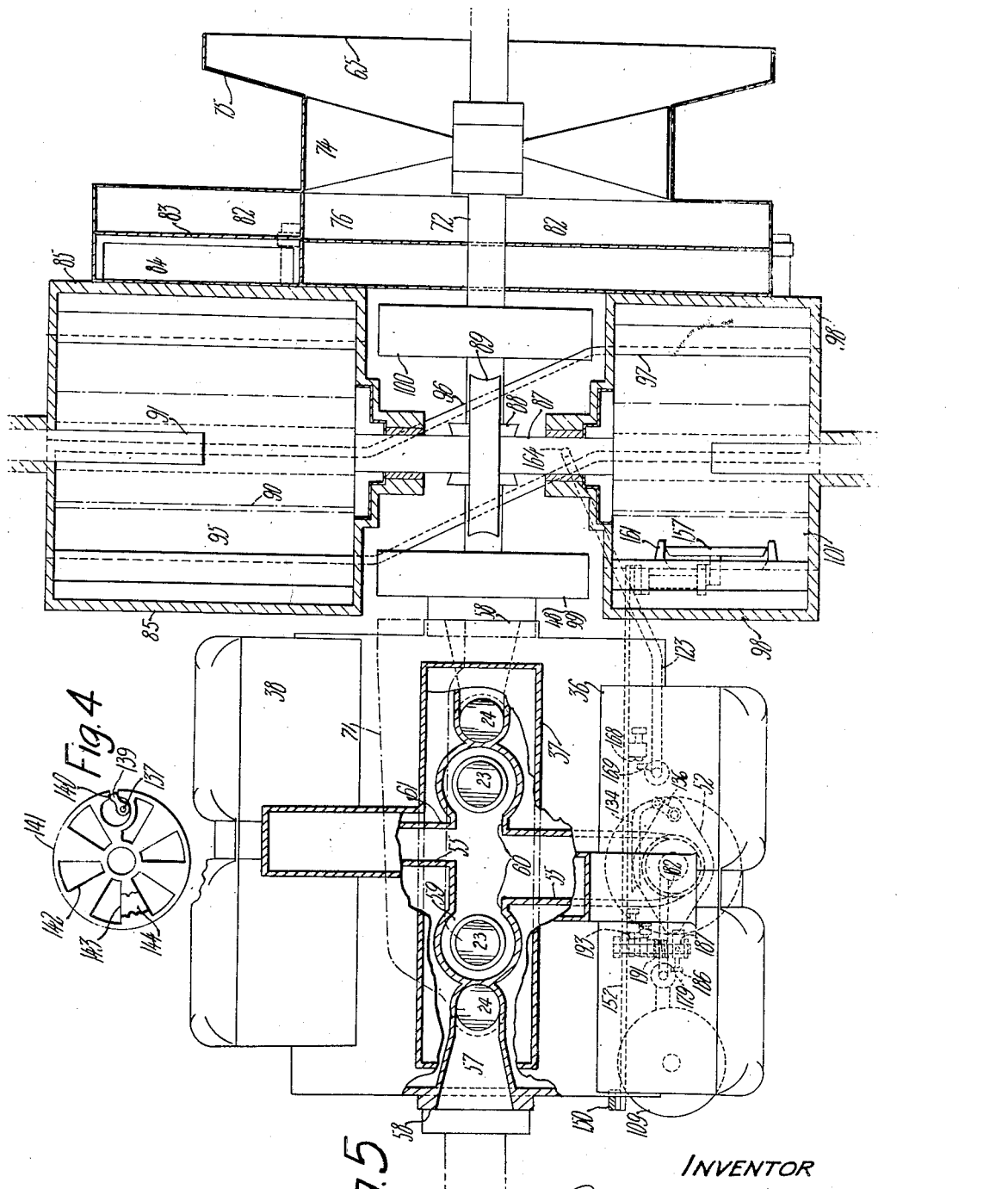

Patented Dec. 24, 1929

1,740,843

UNITED STATES PATENT OFFICE

BURNHAM C. STICKNEY, OF HILLSIDE, NEW JERSEY

INTERNAL-COMBUSTION ENGINE

Application filed May 23, 1927. Serial No. 193,676.

This invention relates to internal combustion engines of the two-cycle type, and its object is to produce a simple, durable, compact, powerful high speed engine of this class at low cost.

Two pistons may operate a single wrist, their engine-cylinders being inosculated, one cylinder for intake and the other for exhaust. The invention, however, is not limited to two cylinders in each osculation. Of these pairs of cylinders there are preferably illustrated six; two cylinders in each, making twelve cylinders. The crank-shaft has two wrists diametrically opposite, and six pistons are connected to each wrist. The engine is of a type having one cylinder-head which is vertical and two cylinder-heads which are inclined at angles of sixty degrees, a line of four cylinders in each head. In each of said heads two of the pistons are coupled to one crank-wrist and two to the other, thus conducing to balance and smooth running. Each pair of inosculated cylinders has a single spark-plug, having six spark-plugs in the engine. There are six equally-spaced explosions in each revolution of the crank-shaft, thus making smooth running. At every sixty degrees of revolution of the crank-shaft, four pistons are stopped, two of which are going in one direction and two in the opposite direction, thus tending still further to smooth running. Every down-stroke of the pistons is a power-stroke, and the disposition of the pistons in opposed pairs and arranged in the form of a sixty-degree W engine has the result that two pistons rise to the top at every sixty-degree revolution of the crank-shaft, and the engine therefore receives six evenly-spaced impulses per revolution.

In each pair of inosculated cylinders there is included an intake cylinder having at the bottom a port which is opened by the piston at the last portion of its downward stroke, while in the other cylinder there is an exhaust port at the bottom of the cylinder. The cylinders have a common explosion-chamber and a common spark-plug. The exhaust preferably opens first, thus reducing the pressure of both cylinders at the time the intake port opens. Fuel is supplied by a blower or air-pump. Scavenging first the intake cylinder and then the exhaust cylinder, with very little liability of mixing the fresh gas with the spent gas, as the ports are so timed that the intake port closes as much in advance of the exhaust port as may be necessary. By means of suitable control, the pressure may be regulated by which the fuel is supplied to the engine, so that at low pressure there will be less scavenging and therefore more admixture of the fresh gas with the spent gas, but the fresh gas will still be segregated, and when compressed it will immerse the spark-plug and will be readily ignited. The engine has a great range of power or flexibility.

The working up of the twelve pistons to two crank-wrists, involving the arrangement of the cylinders to form a W engine, permits the use of a short crank-shaft, conducive to high speed and quietness of operation.

The engine parts may be cast in one piece with the top half of the crank-case semi-cylindrical. The engine-heads with their water-jacketing may project near the top and sides of the semi-cylindrical top half of the crank-case, and the ported chests may be within the crank-casing, together with the lower ends of the cylinder. An intake manifold may also be cast integral with the casing, extending around the inside thereof, and having six opposed openings into the ported intake chests. At one end the intake manifold may open into a carburetor, which is preferably pendent and extending below the engine-crank shaft. This intake manifold may surround the middle crank-shaft bearing, economizing space longitudianlly of the engine. At the ends of the casing there may be six exhaust ports, one for each exhaust cylinder, and any suitable arrangement of muffling may be employed, preferably one muffler for each exhaust cylinder, to avoid back pressure of the exhaust gas from one cylinder obstructing the flow of exhaust gas from another cylinder, especially during the scavenging operation, which is effected by vaporized fuel under only a slight pressure above the atmospheric, say one to four pounds.

Water-jacketing may also be cast integral with the cylinders and crank-case and may include cool water conduits extending along the bottom edge of the upper half of the crank-case, and opening into the water-jacketing of each of the inclined engine-heads. A single water-jacketing may answer for each head. Conduits for the warm water may converge from the inclined water-jacketings to the water-jacketing of the middle or vertical engine-cylinders, and from the latter the heated water may rise to the radiator, upon the siphon principle.

The engine-shaft is extended and at its outer end drives an air-pump. The fuel-supply or carburetor is between the air-pump and the engine. There may be mounted upon the engine-shaft the distributor or timer for operating the spark-plugs, and also the dynamo for charging the usual battery. Thus these revolving parts are driven by a separately-made shaft, and the use of gearing is eliminated because the engine-shaft is so short as to find ample room under the hood of cars of ordinary proportions. The air-pump may be economically driven at reduced speed by silent worm and gear.

The radiator-fan may be fixed on the end of the engine-shaft, and the air-pump may draw air directly from the fan or from the radiator, thereby heating the air, which is an advantage in the subsequent vaporization of the fuel. A grit-trap may be connected so that only clean air will pass through the pump.

The pump delivers compressed air to a carburetor, at four pounds or less.

Air above atmospheric pressure passes through a U into the carburetor and through the Venturi passage in which opens the primary gasoline-jet. One end of the U receives air from a point between the low-pressure and high-pressure pump-sections, for uniformity of pressure, and the other end of the U rises within a gasoline pipe and at its top merges into said jet. The compressed air discharged from the U is trapped so that it cannot force its way down and back into the gasoline-float chamber. The air in the float-chamber remains substantially at atmospheric pressure, and is little if any affected by the presence of air under pressure in the carburetor. The air rising in the U to the primary jet forms minute bubbles, which lighten the column of gasoline, which rises. In other words, the air-charged gasoline rises partly by reason of the weight of gasoline from the float-chamber, and partly by reason of the air entering through the U. Hence a full supply of gasoline to the engine is assured. The float-chamber, if desired, may be of ordinary construction, and a back-check safety-valve may be placed between the float-chamber and the jet, as a precaution against accidental back-flow into the float-chamber, either from explosion in the carburetor, or from any other cause.

While the engine is at rest, the U fills with gasoline from the float-chamber. This reserve is useful on cold days or with a low grade of gasoline, because it serves to prime the engine, and at the original cranking of the engine is forced through the jet and venturi to the intake manifold and the engine-cylinders in the form of a spray in such a quantity as to favor the prompt ignition in the cylinders. The flow from the float-chamber will uninterruptedly rise in the jet, because the compressed air, arriving through the U feeder, immediately expands or loses its pressure and becomes inert, and unable to press down the gas in the jet-column, or force it back into the float-chamber.

Provision is made for varying the pressure of the air-supply to the carburetor and engine from nearly maximum down to atmospheric pressure at will. A relief valve is provided in the air-main between the pump and the carburetor and is normally spring-opened. Pressure of the foot upon the usual accelerator closes said relief valve. To start the engine, the pedal is depressed and the valve fully closed. As soon as the engine starts, the accelerator may be partly released, and the spring will open the relief valve in the air main until the pressure of air delivered to the carburetor is reduced to the desired point to give the desired speed of running to the engine; and thereafter the pressure may be varied at will by operating said pedal. The air-pump is over-size, so that when the engine is being cranked it will supply an excess of air to the engine, and at all times is capable of supplying more than the engine needs, so that said relief valve may always be open more or less under normal running of the engine, and may be fully closed only in an emergency or to start the engine. At least one intake port may be open at every point of the revolution of the crank-shaft, so that in case the ignition is shut off there will be a temporary continued flow of gasoline vapor through the manifold, which will escape through the open exhaust port and go to waste.

To control automatically the supply of air to the primary jet, there is provided a valve controlled by the same accelerator pedal. When the pedal is operated to close the relief valve, the jet-valve admits a larger supply of air under pressure, so that there may be fed to the engine a larger proportion of gasoline. By an adjustment provision is made for steady running of the engine. The jet-valve is closed by a spring, and has a small opening which admits a minimum of air to the jet even when the valve is closed.

In starting the engine and at other times, the air in the main may be shut off from the outer or large Venturi tube by means of a shutter, which is also under the control of said accelerator pedal. The shutter may be also under manual control, so as to be left wholly or partly open or closed at the will of the operator; and for this purpose a button is provided in the dash of the automobile, which may be pulled out to close the shutter and confine the flow of air to the small venturi.

If it is desired to provide a still greater supply of fuel for emergencies, there may be used an auxiliary jet, the air supply of which may be connected to the air main, so as always to get the benefit of the pressure that prevails in the main. This auxiliary air supply is also in the form of a U conduit, and at its delivery end it opens into a second jet-column, which column is normally filled with gasoline up to the level of the fluid in the float-tank. This auxiliary air supply may be normally closed or nearly so, and the auxiliary jet may be normally out of use while the engine is running. By pulling out a dash control, the air supply is opened. The compressed air then flows into the auxliary U tube and discharges its reserve of gasoline, and carries the same upwardly through the auxiliary jet. Fresh gas continues to flow in through the float-chamber, aand the air also continues to flow through the auxiliary U tube and to mix in the form of fine bubbles with the auxiliary column of gasoline, forcing it to discharge through the auxiliary jet. This operation continues as long as the auxiliary air inlet in the main carburetor remains open. By the use of a vent, the pressure of air upon the auxiliary reserve may be normally lightened, depending upon the adjustment of the vent, and it may be closed automatically by the depression of the accelerator pedal and also by the train that closes the shutter in the carburetor. This vent is also adjustable by means of a screw plug, thereby controlling the action thereof independently of the aforesaid manual adjustments; and similar controls may be used in other places in the carburetor.

Other features and advantages will hereinafter appear.

In the accompanying drawings,

Figure 3 is a sectional view of the carburetor and engine-controlling mechanism on a larger scale.

Figure 4 is a plan of a shutter employed in the carbutetor.

Figure 5 is a plan of the engine, partly in section, pump, carburetor, etc.

Figure 1:
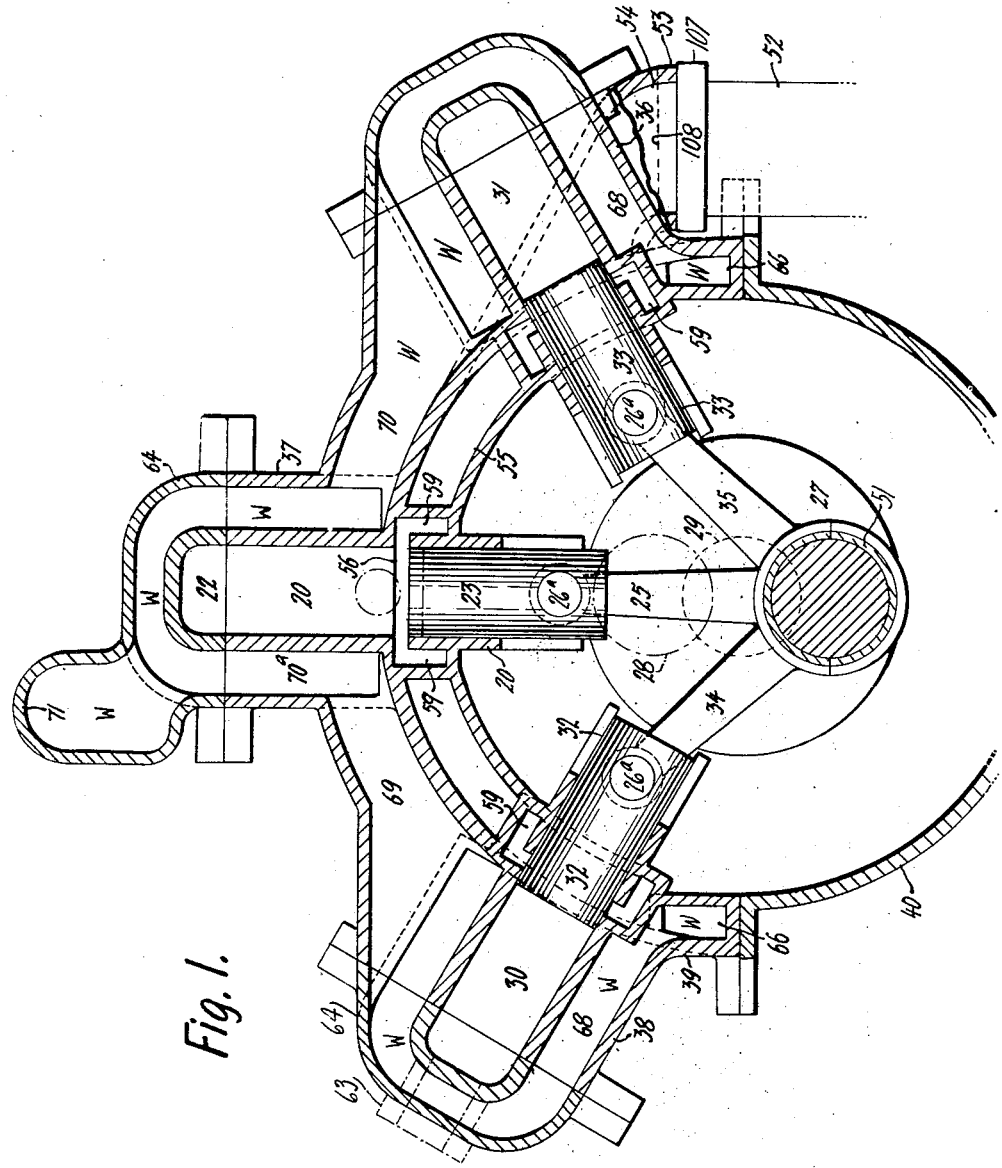
Figure 1 is a cross-sectional elevation of the engine-block, showing a middle piston fully depressed, and indicating the connection of six pistons to one crank-wrist.

In the preferred form of the invention, there are employed twelve cylinders inosculated in pairs, including an intake cylinder 20 and an exhaust cylinder 21, which may be placed side by side, with a common explosion-chamber or inosculation 22. In these cylinders reciprocate pistons 23, 24, connected by rods 25, 26 and pivots 26ª to wrists 27, 28 of a two-throw crank-shaft 29. The pistons in each pair move as a unit. At Figure 2 is shown a line of four middle upright cylinders, that is, two pairs of cylinders 20, 21. To each crank-wrist are articulated six rods connecting it to six pistons working in six cylinders extending in three directions, as will be understood from Figure 1. Four cylinders 30 in one line are inclined to the left at an angle of sixty degrees from the vertical, and four cylinders 31 in another line have a similar inclination to the right; pistons 32 working in cylinders 30, and pistons 33 working in cylinders 31. Pitmen or rods 34 connect pistons 32 to the crank-wrists 27, 28, and pitmen 35 connect pistons 33 to the same crank-wrists. From Figures 1 and 2 it will be understood that there are three lines or groups of pistons, four in each group; each group being subdivided into two pairs, the pistons in one pair moving as a unit in the opposite direction from the pistons in the other pair, to promote balance, as will be seen at Figure 2.

Figure 5 shows that the four cylinder groupings and their respective engine-heads have an echelon arrangement, agreeing with the allocation of the pitmen on the left-hand and right-hand crank-wrists 27, 28.

The engine-block includes a transverse row of three water-jacketed radial engine-heads 36, 37, 38, arranged in echelon transversely of the engine-block; and each engine-head includes four cylinders and four pistons. The left-hand crank-wrist 27 accommodates six pitmen, of which the first and fourth (each numbered 35 at Figure 2) belong to pistons working in the left-hand division of the engine-head 36; the second and fifth (numbered 26, 25) on said left-hand crank-wrist 27 belonging to pistons 24 and 23 in engine-head 37, and the third and sixth (each numbered 34) on said crank-wrist 27 belonging to pistons working in the left-hand division of engine-head 38. The extent to which each engine-head is offset from the next may therefore agree with the width of a pitman or its hub. The piston-rods in each pair are designed to go up and down as a unit, so as to co-operate with a single crank-wrist as 27; and, by separating the rods, space is secured between them for two pitmen running to two other pistons, and room is also left at the ends of the crank-wrist 27 for the remaining two pitmen, making up the six. This conduces to shortness, rigidity, simplicity, balance and smooth running of the crank-shaft and other parts; and a corresponding arrangement exists between the right-hand crank-wrist 28 and its piston-rods.

Every down stroke of each piston is a power-stroke, and, since the pistons in each pair move as a unit, there are six evenly-spaced impulses at each revolution of the crank-shaft, thus placing this simple engine upon a par with the well-known twelve-cylinder, six-throw, four-cycle engine, with its twenty-four valves. In other words, there are twice as many impulses for each revolution as can be obtained with the well-known six-cylinder, six-throw, four-cycle engine. This is accomplished by the use of only two crank-wrists in an engine in which every other piston-stroke is a power-stroke.

Said engine-heads 36, 37 and 38 may rise from a closed engine-block 39, which may be semi-cylindrical, and to which may be fastened a drop-portion of a crank-case 40; the engine-block having end bearings 41, 42, and a midway bearing 43 for the crank-shaft, the latter being held up by separately detachable bearings 44, and the engine-block having closed ends 45. Each cylinder may be about double the length of its piston, one-half of the cylinder extending outwardly from the engine-block, and the other half extending inwardly therefrom towards the crank-shaft 29, for compactness of engine and shortness of piston-rods.

It will be understood that, at each revolution, each pair of pistons is arrested twice at the opposite end of the stroke from the other pair in the same line or group, Figure 2; there being two arrests in each group at each revolution, making six arrests altogether in each revolution of the entire system of pistons, and these six arrests occur at intervals of sixty degrees, making a smooth running engine, which, moreover, is evenly driven by reason of the six evenly-spaced impulses at each revolution.

The crank-shaft may be cut from a cylindrical bar to form the crank-wrists and the journals, leaving uncut full-diameter portions 46 to serve as cranks and fly-wheels, and also leaving similar portions 47 at each side of the main journal 29 for a similar purpose, and also preferably forming a fly-wheel 48 at the front of the engine, that is, the end opposite from the main power-delivering end, for the purpose of minimizing the tendency of the free end of the crank-shaft to twist. These fly-wheels may be provided with annular weights 49 fixed thereto. Both the fly-wheels and the weights may be cut to counterbalance the weight of the crank-wrists 27, 28, which may be made hollow at 49ª to reduce their weight. Upon each crank-pin may be placed a thin-wallet split bearing-collar 51, to reduce friction between the piston-rods and the wrist. There may be but little rotary movement between the collar and the piston-rod hubs, while the friction between the collar and the wrist is relatively slight because of the great area of the bearing-surface. Moreover, if any hub should seize, it would seize the collar and not the wrist.

Figure 2:
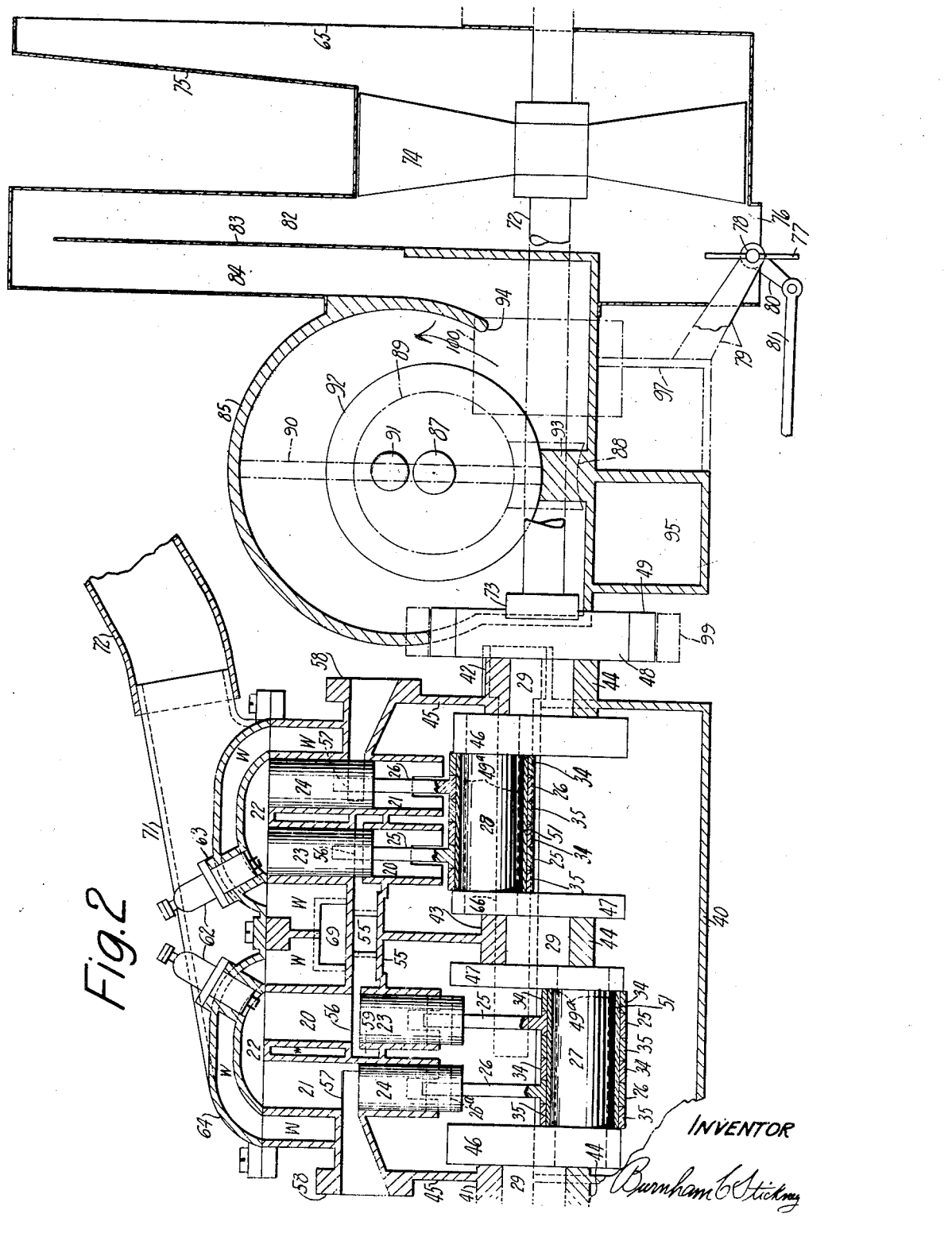
Figure 2 is a longitudinal sectional view of the engine and pump and their appurtenances.

The fuel for the engine, in the form of mixed air and gasoline, may be delivered to the engine through a carburetor 52, which may be attached by its upper end to the right-hand end, Figure 1, of an intake manifold 53, said manifold having a passage 54 at its end which leads to the main manifold-passage 55, extending around the interior of the cylindrical engine-block from side to side and tapped for delivery to the inner cylinders in the several engine-heads. In other words, the manifold divides each group into its two pairs, Figure 2, and the inner cylinder in each pair has only an intake port 56; all of these intake ports opening directly into the manifold-passage 55. The outer cylinders 21 in the several couples at Figure 2 have only ports 57 which exhaust into the atmosphere or into one or more mufflers, which may be connected in any suitable way by means of ducts attached to flanges 58 on the opposite ends of the engine-heads, there being three of these exhaust ports at each end of the engine-block, and the port expanding rapidly from the engine-cylinder to the flange 58, to insure quick reduction of the pressure and temperature of the burned gas.

Part of the shell of the engine-block forms the top of the intake manifold 53, 55, the arcuate body of which projects within the chamber of the engine-block, with obvious advantages.

Each intake port 56 may be open all around the cylinder, or bisect the same, to secure maximum capacity and speed of gas-flow, and this port may open into an annular passage 59 surrounding the top of the lower sections into which the cylinder is bisected by said port 56. This annular passage 59 opens directly into a side orifice 60 in the intake manifold 55. The orifices 60 of the adjacent intake cylinders may be in line, as shown in Figure 5. From the crown of the cylinder-block to the left-hand side thereof, the manifold may be relatively narrow as at 61, Figure 5, since it has to supply fuel to only one line of four cylinders. The main portion of the manifold 55 may, however, be of relatively ample diameter, because it has to supply eight cylinders in two engine-heads; while the inlet-passage 54 may be of even larger proportions, because it has to supply all of the engine-heads.

In the operation of the engine, when any piston is at the bottom of its stroke, as at 23, Figure 1, the intake port 56 is wide open, and the explosive mixture of air and fuel is forced through the manifold and the orifice 60 and the annular chamber 59 and port 56, entering the cylinder 20 at Figure 2, and forcing the burned gas upwardly in cylinder 20, and across through the explosion-chamber of inosculation 22, and down through the exhaust cylinder 21 and out of the exhaust port 57; the fresh entering gas taking the place of the displaced exhaust gas, and either filling both cylinders completely or only partially occupying them, and perhaps leaving the explosion-chamber 22 and the cylinder 21 filled with burned gas, or effecting some other partial filling of the compartments 20, 21 and 22 between maximum and minimum filling. The degree to which the fresh gas displaces the exhaust gas will depend partly upon the speed of the engine, or partly upon the pressure at which the gas is supplied through the inlet port 56 to the cylinders, and such pressure and speed are variable and under the control of the operator. Since the engine is in motion, the piston 23 rises and quickly closes the intake port 56. At the same time, piston 24 rises, and soon closes the exhaust port 57. The fresh gas, which is supplied under pressure, say one or two pounds above atmospheric, has an opportunity to expand and drive out more of the exhaust gas before the rising piston 24 closes the exhaust port. Both pistons 23 and 24 continue to rise, being driven up by the crank-wrist 27, whereby the charge of fresh gas is compressed preparatory to firing. It will be seen that the spark-plug 62 is placed directly over the intake cylinder 20, Figure 2, at the portion of the explosion-chamber 22 which is occupied by the compressed fresh gas at the time when the piston 23 is at the top of its stroke. This tends to quick and sure firing of the charge, whether the same was originally a full charge of both cylinders or only a partial charge of the intake cylinder, or any intervening volume.

The two pistons are driven down by the exploded charge, and the exhaust port 57 may have a lead of say fifty or sixty degrees, that is, it may open when the crank-wrist 27 is within fifty or sixty degrees of its lowest position, so that there may be substantial exhaust of gas through 57, and hence a substantial reduction of the pressure of gas in the inosculated cylinders, and hence a substantial reduction in the temperature of the burned gas, before the intake port 56 opens, thus avoiding liability of pre-ignition of the fresh charge now to enter through the port 56. Moreover, the lead of the exhaust port 57 over the intake port 56, or the relative narrowness of 56, guards against an excessive supply of charge to the cylinders, since 56 is opened later and closed earlier than 57. When 56 does open, the charge being supplied with a pressure of say one or two pounds or more per square inch, there may be yet enough pressure in the cylinders 20, 21 to force back the charge, which will therefore be forced down temporarily into the annular chamber 59 and perhaps partly out into the orifice 60, without liability of it becoming unduly mixed with the exhaust gas; but upon the further exhaust of the burned gas, the pressure thereof will diminish so far as to permit the compressed fresh gas to sweep out some or all of the burned gas, as already explained, through port 57, the latter extending nearly the entire circumference of the cylinder 21 to give it ample capacity.

The engine-heads may be cast in one piece with the manifold and with the water-jacketing; the water-spaces being indicated by W, and being all outside of the cylindrical engine-block, which therefore forms the bottoms of the water-jackets.

The spark-plugs 62 may be set in sockets 63 in detachable water-jacketing engine-caps 64, one cap for each engine-head, whereby each explosion-chamber is cooled as well as each cylinder. The cooling water, working on the siphon principle, may be conducted from the radiator 65 through two tubes (not shown) to the forward ends of two interior channels 66, Figure 1, extending along the flanks of the engine-block, said channels having openings up into the water-jackets 68 surrounding the cylinders, one water-jacket 68 serving for the entire line of four cylinders. From the middle portions of the water-jackets of the side engine-heads may extend two water-ways 69, 70, opening into the water-jacket 70$^a$ of the middle engine-head. Hence the water supplied through the channels 66 has a clear course to rise when heated, and it finally reaches the top water-jacket 70$^a$ and the cap 64, whence it may flow up into a conduit 71 and from thence, by a hose, back to the top of the radiator 65, thus completing the siphon action. The water-jacketing, except for the caps, may be cast all integral with the engine-heads and block.

The use of gears for driving the ignition-distributor and electric generator may be avoided, since these devices may be placed directly upon the crank-shaft or upon an extension 72 thereof, which, by means of a head 73, may be coupled to the fly-wheel 48. This conduces to quietness and to speed, durability and security; and a water-cooling fan 74 may be secured upon the forward portion of said shaft, just in rear of the radiator 65, which is set up to an elevation to secure proper circulation of the water. This position of the fan is an advantage since it avoids the necessity for a driving belt; and it may be caused to draw the air through the overhead radiator by the expedient of providing a downwardly directed conduit 75, which forms a shallow casing extending back from the radiator and down to the fan, which it encloses, so that revolution of the fan will draw air through the radiator and down through the conduit, from whence it will be forced out by the fan. The fan and radiator-casing may be entirely closed except for an outlet opening 76 at the bottom, just in rear of the fan; and, when the engine is to be started or warmed up, this opening may be closed by a fly-valve 77, pivoted at 78 upon a pair of supports 79; the opening 76 extending for the main portion of the width of the casing for capacity. This valve 77 may be closed and opened by means of an arm 80 pivoted therewith, and operated by a train extending to the reach of the operator and including a rod 81. The air-casing forms a box, the middle portion of which may fit closely around the periphery of the fan to minimize leakage; and preferably a portion of the heated air from the fan is used for supplying the carburetor, which is between the fan and the engine.

For cleaning the air for the engine, it is caused to rise in a passage 82 and pass over the top of a partition 83 in the casing, and thence down a passage 84 to the intake side of a two-stage air-pump or blower 85, which may be of any suitable type, as for example, that shown in the patents to Machlet Nos. 902,501 and 1,119,972. The two pump-units 85 and 98, shown, have a common horizontal drive-shaft 87, which extends transversely of the engine-shaft 72 and is driven therefrom by means of a worm 88 on the engine-shaft, meshing with a worm-wheel 89 on the air-pump or charger-shaft 87, so that the charger may revolve at say one-half to one-fifth the speed of the engine, the reduction in pump speed conducing towards efficiency and economy of operation. Passages 82 and 84 occupy one side portion of the casing, as seen in the plan at Figure 5, while the air-outlet 76 occupies the main portion of the bottom of the casing, which is closed all around except for 76 and 84. The left-hand pump-unit drum 85 is seen in Figure 2, and includes a revolving piston-blade 90 slidingly articulated to a fixed stud 91, and working within the drum 85. This blade is swept around by means of a cylinder 92, slotted to receive the piston-blade and fitting upon a narrow bed 93 between the intake and delivery sides of the pump, all as set forth in said Machlet patents. Said passage 84 may lead down to the intake port 94 of the pump, upon the other side of which the air, at a pressure of one pound or more, may be delivered to a delivery-duct 95; and this may be connected, by a diagonal duct 96, to the intake chamber 97 of a similar higher pressure air-pump 98, upon the right-hand side of the engine at Figure 5. This unit 98 is similar to 85 but shorter, receiving the air under pressure from the unit 85 and delivering it under a greater pressure, say two pounds or more, to the carburetor for the engine.

The fly-wheel 48 may occupy a position between the pump-units at Figure 5, and it may form one member of a dynamo for charging the usual electric battery, the remainder of the dynamo being of annular form around said fly-wheel and indicated at 99. 100 indicates a distributor which may conduct electricity from the battery and distribute it, in proper timing, to the various spark-plugs 62. All of the driven parts may therefore be placed upon the engine-shaft, except the air-pump, which is driven noiselessly by means of a worm, at reduced speed. It will be seen that the whole engine with the pump and other appurtenances may be light, compact and inexpensive.

From the delivery chamber 101 of the high-pressure air-pump the compressed air is suitably conducted to the main chamber 121 of the carburetor designated generally as 52 and having in its delivery portion a small Venturi tube 104 nested within a large Venturi tube 105, delivering the mixture of air and vaporized gasoline through a passage 106, as is usual with a Stromberg carburetor; the carburetor being attached by means of flanges 107, which are fastened up against flanges 108 provided upon the engine-block at the intake end of the manifold, Figure 1. The carburetor may thus depend from the lower end of the manifold, so that liquid gasoline collecting in the manifold may drip back into the carburetor, and little or none pass over into the left-hand engine-head.

The liquid gasoline is fed intermittently into a float-tank 109 through any suitable means, as for example, a feed-pipe 110 open at its bottom within the tank and closed by a tapering plug 111 rising from the middle of the float 112. The air in the float-chamber should be at or only a trifle above atmospheric pressure; and the tank may therefore be provided with an air-pressure relief valve 113 with a spring 114, all enclosed in a fire-proof wire meshing of dome form 115. The level of the gasoline is indicated by a dotted line 116.

The gasoline descends through a tube 117, and past a back-check valve 118 to a horizontal gasoline-main 119, from which the gasoline wells up in a feed-tube 120, rising within the air-main or chamber 121 of the carburetor and terminating in a jet 122 extending up within the small Venturi tube 104, the tip of the jet being considerably above the gasoline level at 116.

The gasoline is fed up through the jet by means of the described blower or air-pump. The pressure of the air, when delivered at the jet, is lower than its pressure at the point where the air is taken from the air-pump. The air enters the carburetor through a tube 123, and flows into an elbow passage 124 and through a pressure-regulating valve 125, and down through a tube 126 which, at its lower end, communicates by a cross-tube 127 with the bottom end of an upright tube 128, which extends up within the gasoline-tube 120 and, at its upper end, terminates in a spray or perforated head 129 arranged within a bulb 130 formed in the gasoline-delivery tube 120. Members 126, 127, 128 form a U arrangement. The air may reach the spray head 129 at a pressure above atmospheric pressure, and may force the spray out of the perforations in the spray head into the liquid gasoline, forming minute bubbles which lighten the column in the jet 122, so that the column of mixed gasoline and air-bubbles rises to the top of the jet, where it is picked off by the air flowing from the air-pump into the Venturi tube 104, and is carried off to the manifold and the engine-cylinders. The bubbles of compressed air tend to expand within the bulb 130, and hence the pressure of any bubble rising in the jet 122 may be little, if any, above atmospheric pressure. The feed of the fuel up through the jet may be caused partly by lightening the gasoline with the air-bubbles, and partly by the pressure of the incoming air rising in the air-supply pipe 128 and escaping through the apertures in the spray into the body of the gasoline in the bulb 130, even though the internal pressure of the bubbles thereupon diminishes. It will be seen that the air is trapped and therefore cannot force its way down from the spray 129 to the bottom of the gasoline-tube 120 and thence back towards the float tank. That is, the air-bubbles forming in the bulb 130 will not sink, even if they do tend to expand, and hence will never reach the bottom of the gasoline-supply tube 120.

When starting the engine, or when driving it at low speed, it is an advantage to check or stop the upward flow of air around the Venturi tube 104, so that all of the air, which is then being supplied under very light pressure, may be confined to the interior of said Venturi tube 104. This result may be gained by pulling up a dash-control button 131, connected by a flexible or Bowden wire 132, working in a tube 133, thereby drawing forward a link 134, whose rear end is pivoted at 135 to a crank 136 provided upon the top of a vertical shaft 137 which is mounted in a bearing 138, rising from the top of the carburetor-chamber. Said shaft has at its lower end a tooth or arm 139, Figure 4, which works in a slot 140 formed in a shutter 141 pivoted or mounted to rotate about the lower end of the small Venturi tube 104, and having a series of radiating openings 142, which, when this shutter is opening, coincide with openings 143 formed in the flat top 144 of the air-chamber. By pulling up said dash control 131, the shutter is rotated so as to close said top, and hence the air arriving from the pump under light pressure is confined to the passage within the small venturi, where it flows rapidly past the top of the jet 122, and there picks up sufficient gasoline-vapor therefrom to supply to the engine for starting or idling.

The speed of the engine may be controlled by means of a transverse rock-shaft 145, which may be operated by a pedal 146, alternately with a control lever (not shown) placed conveniently upon the hub or support of the steering wheel of the automobile; a combined pedal and steering-wheel control of cross-shaft 145 being known in this art. The crank-arm 147 of said shaft may be connected by a link 148 with a lever 149—150 upon a stud or shaft 151. To the arm 150 at its lower end may be pivoted the rear end of a general control link or rod 152, which, at its forward end, may be pivoted at 153 to an upright arm 154 that is mounted at its lower end by means of pivots 155 upon lugs 156 cast upon the main casing of the engine. An oblong valve 157 may close a port 158 in the front wall 159 of the delivery chamber 101 of the high-speed unit of the air-pump. This valve 157 may have a stem 160, pivoted at 153 to the arm or arms 154; and the valve may be guided by lugs 161 projecting from the interior side of the wall 159. This valve is normally held open by a spring 162 connected to arm 150. This spring must be overcome by the pedal 146 while being depressed, the effect of the pedal being to draw the valve 157 more or less towards or into its seat 158. The spring 162 holds the pedal 146 up against a stop 163, thereby determining the open position of the valve 157, which may determine the volume of air escaping idly from the air-pump, and hence determine the volume of the remaining air which flows to the carburetor and the engine, and thereby regulate the speed of the engine. The shaft 145, when controlled by the "gas" lever placed at the steering wheel, will set the valve 157 to more or less open or closed positions, as may be required by the operator, and it may be set to a point when the valve 157 is nearly at its maximum open position, such that only a feeble current of air is supplied to the carburetor and engine, which will idle at low speed. It will thus be seen that the speed of the engine may depend upon the volume of air that is wasted from the airpump through the relief valve 157, since the greater the volume of air that is lost, the less will be the volume of air and carbonvapor reaching the engine.

As it is desired to insure efficiency of the jet 122, even though the engine is running at low speed, especially when starting or idling, said jet may be supplied with air from a point of substantially uniform air-pressure. The air-intake tube 123 of the carburetor may therefore open into the air-pump at a point 164 in the diagonal conduit 96 between the two pump-units or sections. In this conduit or at any other suitable point on the delivery side of the first pump-unit 85, the pressure tends to be uniform at all speeds of the engine, including the lowest speeds, because the pressure of air delivered by the primary unit 85 to the high-pressure unit 98 need not be substantially controllable by the relief valve 157, and hence not affected by the operation of the pedal 146 or by the gas-regulating arm at the steering wheel. The jet 122 is therefore efficient for starting the engine (after which the dash control 131 is restored to its open-shutter position) and for maintaining the engine at fair speeds, and as well for idling the engine, thus conducing to simplicity and economy of structure and operation.

The pressure of air in the feed-tube 128 may therefore be substantially the same for all speeds, notwithstanding the fluctuations in the air-pressure in the air-main 121 of the carburetor and in the Venturi tubes 104 and 105. This is of service when the shutter 141 is closed and the engine is idling or being started, and also when the shutter is open and air under substantial pressure is flowing through the air-main 121 and the upper chamber 165 and the outer venturi 105, as well as directly to the small venturi 104. Hence, by manipulation of the pedal, a substantial degree of variation in the speed and power output of the engine may be secured.

When the engine is being started, it will also be seen that aid is at hand in the form of a supply of raw gasoline filling the U which comprises the jet 122, the bulbs 129 and 130, the standpipe 128, the conduit 127 and the vertical tube 126. This piece has the form of a U in order to trap the air which is emitted by the spray 129 so that it cannot descend through the gasoline standpipe 120; but the U has the further advantage that, when the engine stops, it immediately fills with raw gasoline rising from the gasoline-main 119 into the standpipe 120, and descending through the pipe 128 and filling up 127 and rising in 126 to the float-tank level 116. When the engine is being cranked and air under pressure flows up through the venturi 104, there will be enough pressure of air arriving through the pipe 123 and descending in the pipe 126 to force the column of raw gas therein bodily down and through the bottom 127 of the U up into the spray 129, and thence into the bulb 130 and up until it is ejected from the jet 122, which it leaves in the form of a spray, thus fully charging the weak current of air on its way to the engine, so that it will be in condition for prompt ignition. This priming injection of raw gasoline, when starting the engine, will reduce or eliminate the necessity found in usual practice of employing a choke, especially when the shutter 141 is closed and the flow of air is accordingly concentrated through the primary venturi 104.

For varying the pressure of air flowing in through the feed 126, there may be employed an adjustable plug-valve 125, rotatable upon a vertical axis in a valve-chest 166, and having an L-shaped air-passage 124. At Figure 3, said valve is shown closed during the running of the engine at fair speed, and it will be noticed that a reduced inlet 167 is open between the feed-pipe 123 and the descending pipe 126, so that air under light pressure still flows through the U pipe, even though said regulating valve 125 is in closed position.

Whenever the relief valve 157 at the air-pump is substantially or wholly closed, a tappet 168 carried by the general operating rod 152 strikes an arm or crank 169 provided on the top of said valve 125, and rotates the valve until the top of the passage 124 therein registers with the tube 123, thereby making a fully open passage for the entering compressed air to the jet 122, and hence there will be an increased flow of air-bubbles into the column of gas in 130 and 122, and also increased pressure to drive up the mixture of gas and bubbles. Hence, a greater supply of mixed air and gasoline is brought into the venturi 104 at the time that the relief valve 157 is substantially or wholly closed, and thus the engine receives a greater supply of gasoline, as well as a greater supply of air under greater pressure, and it speeds up. The tappet 168 is in the form of an adjustable screw threaded into a lug 170 on said general rod 152, thus affording opportunity to adjust the proportions of the mixture of gasoline and air, according to the quality of gasoline employed, and to meet weather and other conditions. A returning spring 171, around the neck of the valve, may return the valve to normal position when the pedal 146 is relieved from pressure; and a stop 172 may be provided for arresting the valve in normal closed low-pressure position, as seen at Figure 3; the stop 172 being in the form of a screw threaded through the valve-chest 166 and occupying an arcuate slot cut in the periphery of the valve; the extent of movement of the valve depending upon the length of the slot.

It will be understood that, in starting the engine, the dash control 131 may be drawn up to close the shutter 141, and that the pedal 146 may be fully depressed or the "gas" lever fully advanced) to close the relief valve 157 at the air-pump, fully opening the valve 125 and giving sufficient force of air to cause the accumulation of gas standing in the U to advance through the jet and into the engine, and that a strong supply of air under pressure continues to carry into the jet the supply of raw gas rising in the pipe 120 and bulb 130.

There may be provided upon the link 134 a stop 134ª to engage the end of a curved metal tube or casing 133, to arrest the shutter 141 in its open position.

Provision is made for automatic augmentation of the supply of gasoline to the engine, dependent upon the fluctuation in the pressure of the air flowing through the main carburetor-chamber 121. A reserve of gasoline 121ª is provided for the purpose in the carburetor, but when the pressure in main 121 is low, the reserve is not drawn upon. The pressure of air in main 121 occasionally increases during the running of the engine, as for example when the button 131 is pulled up and its shutter is closed, or when the accelerator pedal 146 is depressed, or the gas-lever advanced, or when the automobile meets an acclivity, or the engine has to meet other demand for extra work. Under such circumstances the pressure also increases in a sensitive pressure auxiliary air-passage 173, which leads preferably out of the top of the main 121, and has the form of an inverted U. The ascending portion 174 of the auxiliary passage is relatively short and of small diameter, while the descending tubular portion 175 thereof is relatively long and of great diameter and capacity and normally is filled with a charge of raw gasoline rising to the level 116. The auxiliary passage is given the form of said inverted U so as to prevent raw gasoline from finding its way into the air-main 121 of the carburetor. Said descending tube or well 175 merges into another U, which includes a short transverse pipe 176 and an upright tube 177, the latter terminating in a spray 178 within a bulb or capacious auxiliary standpipe 179, in which gasoline normally rises from the main 119 to the level 116. The spray 178 may operate upon the same principle as 129, and may be similarly constructed, or it may have fewer perforations. The placing of the spray within the auxiliary standpipe 179, at a distance above the horizontal gasoline-supply main 119, prevents the air-bubbles from the spray 178 from working their way down to 119, even though the air in said bubbles is temporarily compressed.

When the air-pressure in the air-main 121 is light, the gasoline stands at the level of 116; but increased air-pressure in the main and in the passage 173 will cause the level of gasoline to descend in tube 175 and to rise in jet-pipe 180. This jet is in the form of an elbow having a horizontal discharge member 181, with a tip or jet 182 opening within the small venturi 104 above the jet 122. Some of the gasoline in the standpipe or well 179 may hence work up through the jet 182, if the pressure in 175 is only moderate, and hence the level of the gasoline may stand near the bottom of the pipe 175, or somewhat higher, while the level of gasoline in the standpipe 179 may or may not be raised (by the air-pressure in 175) to the top portion of the jet-pipe 180, and slowly out through the jet. But if there should occur a sudden substantial increase of the pressure in the air-main 121, for any reason, such as the foregoing, then all of the gasoline in 175, 177 and 178 will be driven promptly up through 179 and 180 and out through the jet at 182, thus greatly enriching the mixture flowing to the engine, which is thereby temporarily accelerated automatically. The standpipe or bulb 179 may terminate in a tapering or jet-like portion 183 leading to the jet-pipe 180, to augment the flow already described. Should the pressure in main 121 continue to be high, then air will continue to flow through 173, 174 and 175, and through the spray 178 into the gasoline that wells up from the main 119 through the standpipe 179, so that an extra force of gasoline continues to be fed automatically to the engine throughout the increased supply of air to the engine. Upon releasing the pedal 146, or for any other reason upon lowering the pressure in main 121, gasoline will rise from the main 119 in the pipe 179 and settle through 178 and 177 and rise in 175 to the level 116, constituting a new reserve to meet the next extra demand upon the engine.

In order to prevent undue dropping of the level 116 in the auxiliary standpipe 175 there may be provided a constricted vent or passage 184 to the atmosphere, said passage discharging at 185 and thus lessening the downward pressure of the flowing air upon the body of gasoline at 116. This vent 184 need not be so capacious as 173, and there may be a steady exhaust of air through 184, just sufficient to relieve the higher pressure within 175, and maintain the level of the gasoline at the desired height. The escape of air through the vent may be permanently regulated by a pointed screw valve 186, which may be tightened to close the vent 185 or may be unscrewed to open it, or adjusted to any intermediate point.

If it is desired to close the vent 184 temporarily, there may be provided a plug-valve 187, rotatable by means of an arm 188, and having a vertical passage 189 forming part of the vent 184. By rocking the arm 188 the vent 184 may be closed, and hence the full pressure of air in main 121 may be used to depress the level of the gasoline in 175, 178 and 179, and to discharge a rich supply of gasoline through the secondary jet 182. This arm 188 may be operated by means of the link 134, which may have a shoulder 190, in the path of which said arm 188 is placed, so that when the shutter 141 is closed, the vent 184 is also automatically closed. The closing of the shutter tends to increase the pressure of the air entering into main 121, and also to increase the pressure of air in 175, thereby augmenting the discharge of gasoline through the auxiliary jet 182, thus aiding in starting the engine. This shutter may also be closed while the engine is idling, so that the carburetor is rendered capable of supplying a rich mixture to the engine even though a diminishing supply of air is reaching the carburetor-main from the air-pump. Each of the jets 122 and 182 is hence capable of giving an over-supply of gasoline with an under-supply of air arriving through the main 121, so that a low rate of idling may be maintained. When the dash control 131 is pressed down again, a spring 191 coiled about the shaft of the valve 187 may return the same to normal position, against a stop 192. This stop is made adjustable so that it may arrest the valve in partly open position. This gives two means for regulating the exhaust of air through this vent 185.

Provision is also made for closing the vent-valve 187 when the accelerator pedal 146 is depressed, this being in the form of a screw tappet 193, threaded through a lug 194 in the general controlling rod 152, which strikes a pin 195 that is carried by the arm 188, so that, when the pedal is depressed, air-pressure in 175 is increased and an extra supply of gasoline is temporarily delivered automatically by the auxiliary jet 182; and the supply of gasoline from the float tank through the gasoline-main to the auxiliary jet is maintained, as already explained, until the accelerator pedal 146 (or gas-lever) is restored to normal position.

Provision may also be made for a manual control of the flow of air from main 121 into the sensitive U well 175—179. For this purpose the passage 173 is made of large capacity in comparison with the vent 184, and a plug valve 196, having a wide transverse passage 197, is included in the passage 173. This valve is connected by an operating arm 198 to a Bowden wire 199, leading to a control 200 at the dash of the automobile. By pressing down said control 200, the valve 196 may be closed as far as desired, depending upon the adjustment of a stop 201 that is threaded upon the stem 202 of the Bowden wire 199 in position to be arrested by the top 203 of the curved sleeve or armor through which the wire 199 runs. The arm 198 may therefore be swung so as to close the valve 196 so far that all of the air entering through 173 may escape through the vent 184 without raising the pressure in 175. But, at any time, the control 200 may be pressed down, thereby opening wide the passage 173, thus affording manual regulation of the auxiliary U well during the driving. The valve 196 may be left wide open during the starting of the engine, or when the engine has to carry a sudden increase of load, as when coming to a hill. The valve 196 may be left wide open or partially closed during steady driving, at the option of the driver.

Variations may be resorted to within the scope of the invention, and portions of the improvements may be used without others.

Having thus described my invention, I claim:

1. A two-cycle internal combustion engine including a two-throw crank-shaft formed with only two wrists, pistons of which one-half operate upon the first crank-wrist, the remaining pistons operating upon the second crank-wrist, the crank-wrists being diametrically opposed, numerous pairs of cylinders for said pistons, the cylinders in each pair being inosculated, the cylinders for each crank-wrist being separated into various pairs, one cylinder in each pair having an intake port and the other an exhaust port, the ports being at the opposite ends of the cylinders from the inosculation, said pairs of cylinders being equally divided into various groups, each group having its cylinders in line with said shaft, half of the pistons in each group being connected to one crank-wrist, and the other half being connected to the other crank-wrist, each of the groups being set at equal angles to the others, said angles being each less than 90 degrees, each angle forming an aliquot part of 360 degrees, the crank-shaft receiving a multiplicity of impulses at each revolution, all of which impulses are equally spaced, piston-rods connecting the pistons to the shaft, various pairs of piston-rods being connected to each crank-wrist, the rods in each pair, with their pistons, moving as a unit, and means for supplying the cylinders with fuel.

2. A two-cycle internal combustion engine including a two-throw crank-shaft formed with only two wrists, pistons of which one-half operate upon the first crank-wrist, the remaining pistons operating upon the second crank-wrist, the crank-wrists being diametrically opposed, numerous pairs of cylinders for said pistons, the cylinders in each pair being inosculated, the cylinders for each crank-wrist being separated into various pairs, one cylinder in each pair having an intake port and the other an exhaust port, the ports being at the opposite ends of the cylinders from the inosculation, said pairs of cylinders being equally divided into various groups, each group having its cylinders in line with said shaft, half of the pistons in each group being connected to one crank-wrist, and the other half being connected to the other crank-wrist, each of the groups being set at equal angles to the others, said angles being each less than 90 degrees, each angle forming an aliquot part of 360 degrees, the crank-shaft receiving a multiplicity of impulses at each revolution, all of which are equally spaced, piston-rods connecting the pistons to the shaft, various pairs of piston-rods being connected to each crank-wrist, the rods in each pair, with their pistons, moving as a unit, and means for supplying the cylinders with fuel, the pairs of rods being interstitial on each crank-wrist, with the rods of one pair working between rods of another pair throughout the wrist, the cylinders in each pair having an overlapping arrangement with reference to each of the remaining pairs of cylinders that are associated with the same wrist, and the rods in each pair confining between them a plurality of the other rods.

3. A two-cycle internal combustion engine including a two-throw crank-shaft formed with only two wrists, twelve pistons of which six operate upon the first crank-wrist, the remaining six pistons operating upon the second crank-wrist, the crank-wrists being diametrically opposed, six pairs of cylinders for said pistons, the cylinders in each pair being inosculated, the cylinders for each crank-wrist being separated into various pairs, one cylinder in each pair having an intake port and the other an exhaust port, the ports being at the opposite ends of the cylinders from the inosculation, said pairs of cylinders being equally divided into three groups, each group having its four cylinders in line with said shaft, six of the pistons in each group being connected to one crank-wrist, and the other six being connected to the other crank-wrist, the three groups being set at angles of sixty degrees each to the others, the crank-shaft receiving six equally spaced impulses at each revolution, twelve piston-rods connecting the pistons to the shaft, three pairs of piston-rods being connected to each crank-wrist, the rods in each pair, with their pistons, moving as a unit, and means for supplying the cylinders with fuel.

4. A two-cycle internal combustion engine including a two-throw crank-shaft formed with only two wrists, pistons of which one-half operate upon the first crank-wrist, the remaining pistons operating upon the second crank-wrist, the crank-wrists being diametrically opposed, numerous pairs of cylinders for said pistons, the cylinders in each pair being inosculated, the cylinders for each crank-wrist being separated into various pairs, one cylinder in each pair having an intake port and the other an exhaust port, the ports being at the opposite ends of the cylinders from the inosculation, said pairs of cylinders being equally divided into various groups, each group having its cylinders in line with said shaft, half of the pistons in each group being connected to one crank-wrist, and the other half being connected to the other crank-wrist, each of the groups being set at equal angles to the others, said angles being each less than 90 degrees, each angle forming an aliquot part of 360 degrees, the crank-shaft receiving a multiplicity of impulses at each revolution, all of which impulses are equally spaced, piston-rods connecting the pistons to the shaft, various pairs of piston-rods being connected to each crank-wrist, the rods in each pair, with their pistons, moving as a unit, and means for supplying the cylinders with fuel, said engine including an engine-block having thereon the various radiating engine-heads, one head for each line of cylinders, and provided with a common intake manifold occupying a position between the various pairs of cylinders associated with one crank-wrist and those associated with the other, all of the cylinders adjoining said manifold on both sides thereof having intake ports communicating therewith, and the cylinders remote from said manifold having exhaust ports.

5. A two-cycle internal combustion engine including a two-throw crank-shaft formed with only two wrists, pistons of which one-half operate upon the first crank-wrist, the remaining pistons operating upon the second crank-wrist, the crank-wrists being diametrically opposed, numerous pairs of cylinders for said pistons, the cylinders in each pair being inosculated, the cylinders for each crank-wrist being separated into various pairs, one cylinder in each pair having an intake port and the other an exhaust port, the ports being at the opposite ends of the cylinders from the inosculation, said pairs of cylinders being equally divided into various groups, each group having its cylinders in line with said shaft, half of the pistons in each group being connected to one crank-wrist, and the other half being connected to the other crank-wrist, each of the groups being set at equal angles to the others, said angles being each less than 90 degrees, each angle forming an aliquot part of 360 degrees, the crank-shaft receiving a multiplicity of impulses at each revolution, all of which impulses are equally spaced, piston-rods connecting the piston to the shaft, various pairs of piston-rods being connected to each crank-wrist, the rods in each pair, with their piston, moving as a unit, and means for supplying the cylinders with fuel, said engine including an engine-block having thereon the various radiating engine-heads, one head for each line of cylinders, and provided with a common intake manifold occupying a position between the various pairs of cylinders associated with one crank-wrist and those associated with the other, all of the cylinders adjoining said manifold on both sides thereof having intake ports communicating therewith, and the cylinders remote from said manifold having exhaust ports, the engine-block having a shell portion forming the upper part of a crank-case, and said intake manifold being integral with said shell portion, the latter having a semi-cylindrical form, and the manifold extending around the interior of the shell from side to side of the engine-head.

6. A two-cycle internal combustion engine including a two-throw crank-shaft formed with only two wrists, pistons of which one-half operate upon the first crank-wrist, the remaining pistons operating upon the second crank-wrist, the crank-wrists being diametrically opposed, numerous pairs of cylinders for said pistons, the cylinders in each pair being inosculated, the cylinders for each crank-wrist being separated into various pairs, one cylinder in each pair having an intake port and the other an exhaust port, the ports being at the opposite ends of the cylinders from the inosculation, said pairs of cylinders being equally divided into various groups, each group having its cylinders in line with said shaft, half of the pistons in each group being connected to one crank-wrist, and the other half being connected to the other crank-wrist, each of the groups being set at equal angles to the others, said angles being each less than 90 degrees, each angle forming an aliquot part of 360 degrees, the crank-shaft receiving a multiplicity of impulses at each revolution, all of which impulses are equally spaced, piston-rods connecting the pistons to the shaft, various pairs of piston-rods being connected to each crank-wrist, the rods in each pair, with their pistons, moving as a unit, and means for supplying the cylinders with fuel, said engine including an engine-block having thereon various radiating engine-heads, one for each line of pairs of cylinders, and provided with an intake manifold, the engine-block having a shell portion forming the upper part of a crank-case, each head including a water-jacket exterior to the shell and enclosing two pairs of cylinders in line, one pair associated with each crank-wrist, each radiating engine-head having two spark plugs opening into the cylinder inosculation or explosion chamber at the top of the intake cylinder, and each radiating head having a detachable water-jacketed cap containing the spark plugs and the inosculation or explosion chamber, the water-jackets of all the radiating heads being in communication with one another around the engine-block, and all of them being integral with said shell.

BURNHAM C. STICKNEY.